(12) United States Patent
Clements

(10) Patent No.: US 7,905,935 B2
(45) Date of Patent: Mar. 15, 2011

(54) TWIST AND LOCK CONNECTION FOR PLEATED FILTER ELEMENT

(75) Inventor: Jack T. Clements, Lee's Summit, MO (US)

(73) Assignee: BHA Group, Inc., Kansas City, MO (US)

( * ) Notice: Subject to any disclaimer, the term of this patent is extended or adjusted under 35 U.S.C. 154(b) by 288 days.

(21) Appl. No.: 12/236,594

(22) Filed: Sep. 24, 2008

(65) Prior Publication Data
US 2010/0071322 A1 Mar. 25, 2010

(51) Int. Cl.
*B01D 46/02* (2006.01)
(52) U.S. Cl. ............... 55/341.1; 55/378; 55/379; 55/484
(58) Field of Classification Search .................. 55/341.1, 55/341.4, 341.6, 374, 378, 379, 341.2, 341.5, 55/361, 482, 484, 490, 492, 505, 508; 210/243; 95/59, 63, 70; 96/55
See application file for complete search history.

(56) References Cited

U.S. PATENT DOCUMENTS

| | | | |
|---|---|---|---|
| 4,228,012 A * | 10/1980 | Pall | 210/238 |
| 4,288,012 A * | 9/1981 | Doak | 294/143 |
| 5,261,934 A * | 11/1993 | Shutic et al. | 95/280 |
| 5,746,792 A | 5/1998 | Clements | |
| 6,203,591 B1 | 3/2001 | Clements | |
| 6,233,790 B1 | 5/2001 | Carothers | |
| 6,375,698 B1 * | 4/2002 | Clements et al. | 55/341.1 |
| 6,676,722 B1 * | 1/2004 | Clements et al. | 55/378 |
| 2005/0205484 A1 * | 9/2005 | Diel | 210/323.1 |
| 2005/2054844 | 9/2005 | Diel | |
| 2006/0032197 A1 * | 2/2006 | Pyron | 55/372 |
| 2008/0120949 A1 | 5/2008 | Welch | |

FOREIGN PATENT DOCUMENTS

| | | |
|---|---|---|
| DE | 10 2007 057304 A1 | 5/2008 |
| WO | 01/95992 A1 | 12/2001 |

* cited by examiner

*Primary Examiner* — Duane Smith
*Assistant Examiner* — Thomas McKenzie
(74) *Attorney, Agent, or Firm* — Pearne & Gordon LLP

(57) ABSTRACT

A baghouse and filter assembly are provided for at least partially removing particulate matter from a gas stream. The filter assembly includes a first filter portion to be supported within the baghouse adjacent to an opening defined by a tube sheet, a first generally-tubular frame, and a first pleated filter media adjacent to the first generally-tubular frame. A second filter portion includes a second generally-tubular frame and a second pleated filter media disposed adjacent to the second generally-tubular frame. A coupler is provided for connecting the first filter portion to the second filter portion and establishing fluid communication between the first and second filter portions when connected. The coupling includes a first coupling portion including a side wall defining a receiver, as well as a lug clip disposed adjacent to the receiver. The lug clip us substantially-elastically displaced in a radial direction from an unbiased position during connection of the first and second filter portions.

16 Claims, 3 Drawing Sheets

TWIST AND LOCK CONNECTION FOR PLEATED FILTER ELEMENT

FIELD OF THE INVENTION

The present invention relates generally to a filter assembly for use in a baghouse. In particular, the present invention relates to connecting structure for a multi piece filter assembly having pleated filter elements.

BACKGROUND OF THE INVENTION

There is increasing environmental regulatory control throughout the world. Much of the regulatory control is focused on reducing air-borne pollutants and emissions from certain industrial sources, such as power plants and materials production facilities. A known technique to control the pollutants and emissions from the industrial sources is to separate undesirable particulate matter that is carried in a gas stream by fabric filtration. Such fabric filtration is accomplished in a dust collection apparatus known in the industry as a "baghouse."

The baghouse typically includes a housing divided into two plenums by a tube sheet. One plenum is a "dirty air" plenum which communicates with an inlet and receives "dirty" or particulate laden gas from a source at the plant. The other plenum is a "clean air" plenum which receives cleaned gas after filtration and communicates with an outlet to direct cleaned gas away from the baghouse. A plurality of relatively long cylindrical fabric filters, commonly called "bags," are suspended from the tube sheet in the dirty air plenum. Each bag has a closed lower end and is installed over a cage. Each bag is mounted to the tube sheet at its upper end and hangs vertically downward into the dirty air plenum. The upper end portion of the bag is open and the interior of each bag is in fluid communication with the clean air plenum.

In operation, particulate laden gas is conducted into the dirty air plenum. As the particulate laden gas flows through the baghouse, the particulates carried by the gas engage the exterior of the fabric filter bags and accumulate on or in media of the fabric filter bags or are separated from the gas stream and fall into an accumulator chamber at the lower portion of the dirty air plenum. Cleaned gas then flows through the media of the fabric filter bags, into the interior of the fabric filter bags, to the clean air plenum and through the outlet. Although many baghouses are made according to this basic structure, there may be numerous operational and structural differences among baghouses.

There is interest in replacing known fabric filter bags with pleated media filter cartridges to increase the effective filtering area while occupying the same, or less, space within the baghouse. However, certain barriers to easy replacement of fabric filter bags by pleated media filter cartridges exist. In some baghouse designs, the fabric filter bags can have a length of about four meters. The clean air plenum often has a clearance height that is substantially less than four meters, for example, about two meters. It is generally not a problem to install fabric filter bags in the baghouse since the fabric filter bags are foldable, flexible and non rigid. A relatively long and rigid pleated media filter cartridge cannot be installed without considerable manipulation if it can be installed at all due to the limited access space in the clean air plenum.

In order to occupy the same space within the baghouse as a fabric filter bag, the length of the pleated media filter cartridge would be relatively long and can be up to about four meters in length or more. This presents a problem for filter manufacturers because there are effective limits as to the width of the filter media that can be pleated with current production machinery. The current production machinery used to pleat filter media typically cannot accommodate continuous filter media more than about two meters in width. Such a long filter cartridge would also be relatively difficult to handle, transport and install.

Accordingly, there is a need in the industry for improvements in filter structure.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some aspects of the invention in a simplified form as a prelude to the more detailed description that is presented later.

In accordance with one aspect, the present invention provides a filter assembly to be secured within a baghouse for removing at least a portion of particulate matter entrained within a gas stream. The baghouse is divided into a plurality of plenums by a tube sheet that defines at least one opening through which the gas stream can travel between the plenums. The filter assembly includes a first filter portion including a mounting structure provided adjacent to a first axial end to couple the first filter element to a support adjacent to the at least one opening defined by the tube sheet. A first generally-tubular frame is coupled to and extends from the mounting structure, and a first pleated filter media is disposed adjacent to the first generally-tubular frame. A second filter portion includes a second generally-tubular frame and a second pleated filter media is disposed adjacent to the second generally-tubular frame. A coupler connects the first filter portion to the second filter portion and establishes fluid communication between the first and second filter portions when connected. The coupling includes a first coupling portion including a side wall that defines a receiver and a lug clip disposed adjacent to the receiver. The lug clip is substantially-elastically displaced in a radial direction during connection of the first and second filter portions. A second coupling portion includes a side wall supporting a cam that causes the substantially-elastic displacement of the lug clip in the radial direction as the cam travels into the receiver during adjustment of a relative angular orientation between the first and second coupling portions caused by a twisting force imparted onto at least one of the first and second coupling portions.

In accordance with another aspect, the present invention provides a baghouse for filtering at least a portion of particulate matter from a gas stream, including a housing divided into at least first and second plenums by a substantially planar tube sheet defining a plurality of openings establishing gaseous communication between the first and second plenums; and a plurality of filter assemblies to be secured adjacent to the openings defined by the tube sheet. Each of the filter assemblies includes a first filter portion including a mounting structure provided adjacent to a first axial end to couple the first filter element to a support within the baghouse adjacent to at least one of the openings defined by the tube sheet, and a first generally-tubular frame coupled to and extending from the mounting structure, and a first pleated filter media disposed adjacent to the first generally-tubular frame. A second filter portion includes a second generally-tubular frame and a second pleated filter media is disposed adjacent to the second generally-tubular frame. A coupler connects the first filter portion to the second filter portion and establishes fluid communication between the first and second filter portions when connected. The coupling includes a first coupling portion that includes a side wall defining a receiver and a lug clip disposed adjacent to the receiver. The lug clip is substantially-elastically displaced in a radial direction from an unbiased position during connection of the first and second filter portions. A second coupling portion is also provided and includes a side wall supporting a cam that causes the substantially-elastic displacement of the lug clip in the radial direction as the cam travels into the receiver during adjustment of a relative angular orientation between the first and second coupling portions caused by a twisting force imparted onto at least one of the first and second coupling portions.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
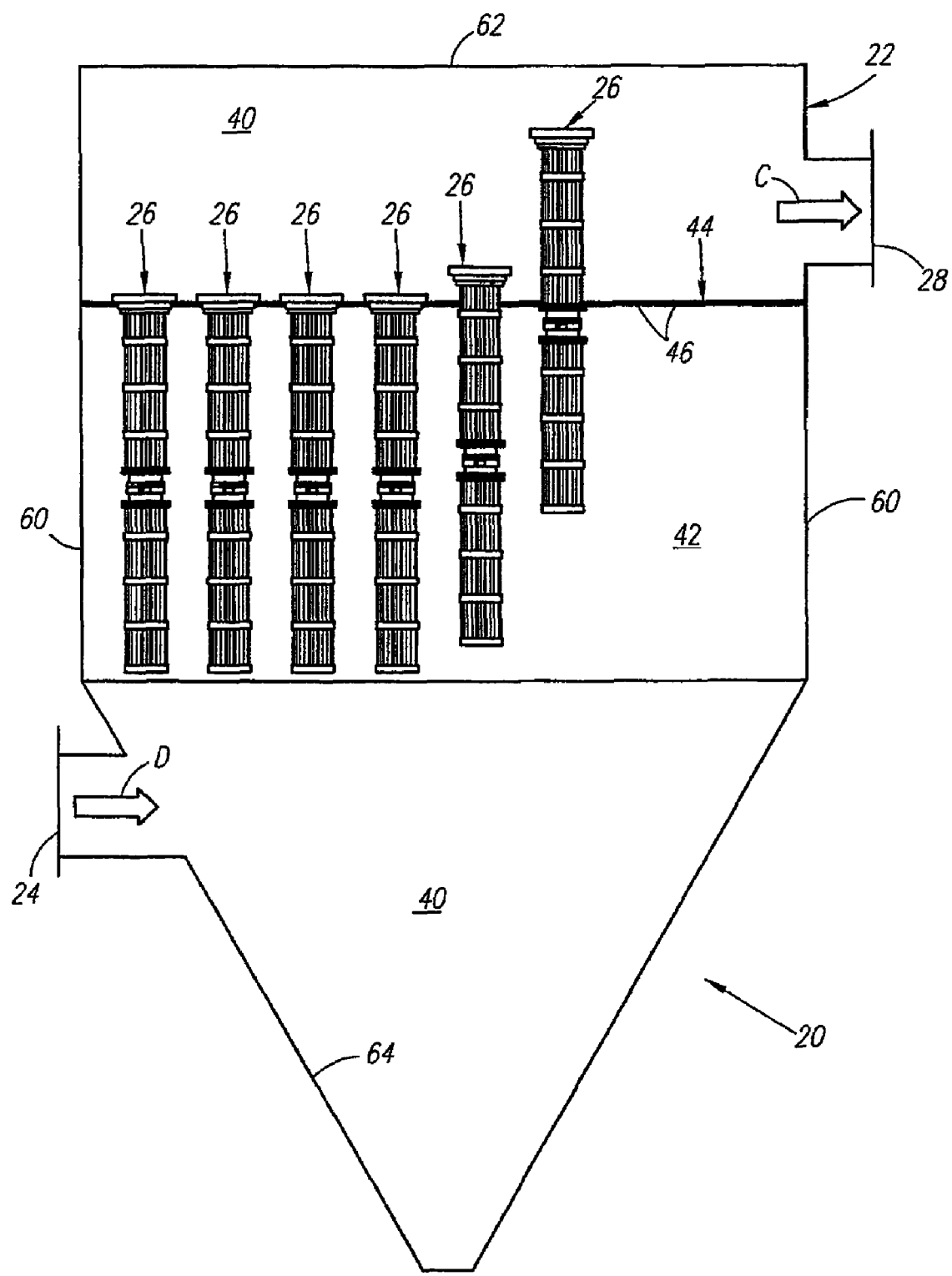
FIG. 1 is a schematic view of the interior of a baghouse in which a plurality of filter assemblies are top loaded for at least partially removing particulate matter entrained within a gaseous stream.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

A baghouse 20 is illustrated in FIG. 1. The baghouse 20 is defined by an enclosed housing 22. The housing 22 is made from a suitable material, such as sheet metal. Particulate laden gas D flows into the baghouse 20 from an inlet 24. The particulate laden gas D is filtered by a plurality of relatively long cartridges or filter assemblies 26 (best seen in FIG. 2) constructed according to one aspect of the invention located within the baghouse 20. Cleaned gas C exits through an outlet 28 of the baghouse 20.

The baghouse 20 is divided into a "dirty air" plenum 40 and a "clean air" plenum 42 by a tube sheet 44 made from a suitable material, such as sheet metal. The tube sheet 44 has at least a portion that is substantially planar. The inlet 24 is in fluid communication with the dirty air plenum 40. The outlet 28 is in fluid communication with the clean air plenum 42.

A plurality of openings 46 extend through the planar portion of the tube sheet 44. A filter assembly 26 is installed in a respective opening 46, and can optionally extend at least partially through the respective opening 46. The clean air plenum 42 has a minimum dimension or clearance height taken in a direction normal to the tube sheet 44 that defines an access space. The dirty air plenum 40 has a height taken in a direction normal to the tube sheet 44 in which a filter assembly 26 can be installed without engaging the housing 22 of the baghouse 20. The height of the dirty air plenum 40 is typically greater than the height of the clean air plenum 42.

The housing 22 of the baghouse 20 includes sides 60 and a roof 62. The baghouse 20 is illustrated as having a non movable roof 62. Thus, access to the clean air plenum 42 and baghouse 20 is limited for installation of the filter assemblies 26. It will be apparent to one skilled in the art that the roof 62 can have access panels that are removable or movable to a position that does not inhibit access to the clean air plenum 42.

The baghouse 20 also has an accumulation chamber defined by sloped walls 64 located at a lower end of the dirty air plenum 40. The filter assemblies 26 are illustrated as not extending into the accumulation chamber but it will be apparent that the filter assemblies may extend into the accumulation chamber.

A circumferentially-resilient mounting band 66 (FIG. 2) is located in one of the openings 46 in the tube sheet 44. The band 66 has a metal portion, such as a stainless steel, and is covered with a fabric portion. The band 66 is constructed with an outer diameter generally equal to the inner diameter of the opening 46. The band 66 (i.e., the fabric portion) may be easily deformed from its normally circumferential shape and inserted into the opening 46. The exterior surface of the band 66 snugly engages the surface defining the opening 46. The band 66 provides a seal between the filter assembly 26 and the opening 46 in the tube sheet 44 to minimize the passage of gas from the dirty air plenum 40 into the clean air plenum 42 between the filter assembly 26 and the tube sheet 44.

The filter assemblies 26 filter particulates from the particulate laden gas D as the gas passes through each filter assembly. Each filter assembly 26 is made up of at least a first or upper filter portion 80 (as viewed in FIG. 2) and a second, lower filter portion 82. The filter portions 80, 82 are axially aligned in an end-to-end stack and connected together in a fluid tight relationship.

Each filter assembly 26 is supported at its upper end (as viewed in FIGS. 1 and 2) by the tube sheet 44 and hangs downwardly in a substantially vertical direction. A tubular mounting sleeve 100 is located at the upper end (as viewed in FIG. 2) of the filter assembly 26 and bears the entire weight of the filter assembly 26 when disposed between the mounting sleeve 100 and the tube sheet 44. The mounting sleeve 100 has an outer diameter that is greater than the outer diameter of the band 66.

Each filter assembly 26 has a longitudinal central axis A-A. Each filter assembly 26 has an overall length taken in a direction parallel to the axis A-A. The length of the filter assembly 26 is greater than the clearance height of the clean air plenum 42 and preferably less than the access height of the dirty air plenum 40 at least in the location closest to the inner periphery of the housing 22. It will be apparent that any number and lengths of filter assemblies 26 could be utilized that are suitable to the filtering requirements of the baghouse 20.

The length of the filter assembly 26 can be any desired length that is appropriate for particular filtering requirements. In one example, at least one of the first and second filter portions 80, 82 of the filter assembly 26 has a length in the range of one meter to three meters. Preferably, the length of the filter portion 80 or 82 is less than the clearance height in the access space of the clean air plenum 42. It will also be apparent that the length of the first filter portion 80 can be different from the length of the second filter portion 82.

Figure 2:
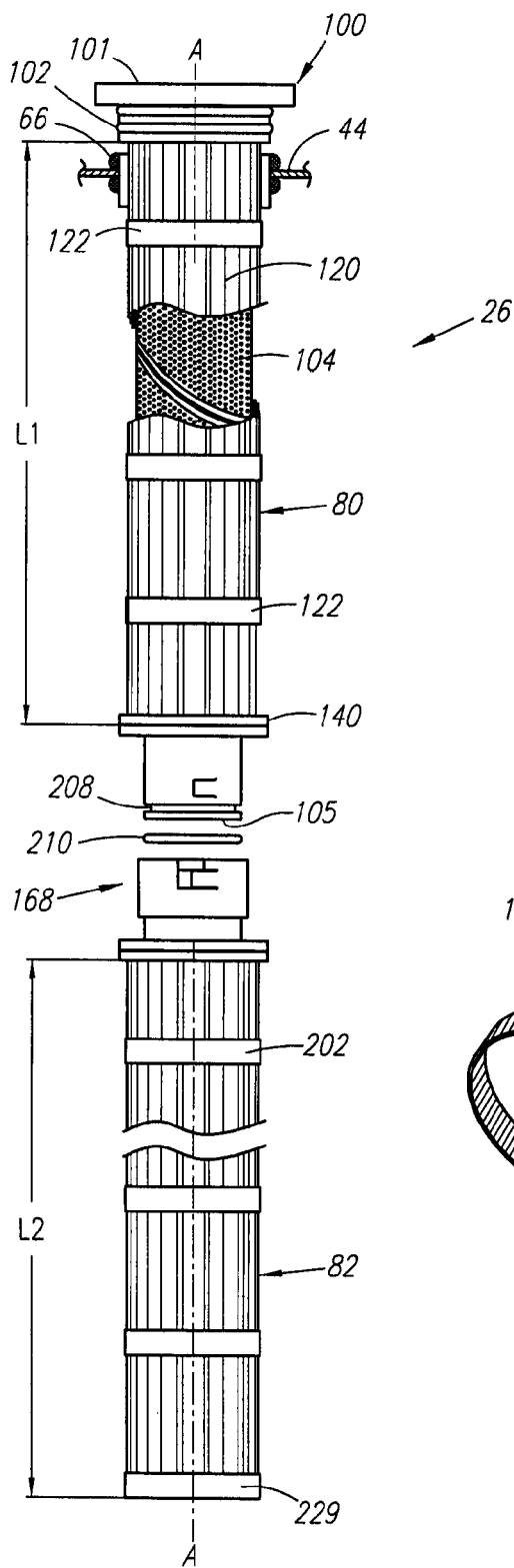
FIG. 2 is an exploded elevational view of an aspect of a filter assembly.

The first filter portion 80 is open at both axial ends 101, 105, as illustrated in FIG. 2. The mounting sleeve 100 is located at an upper axial end 101 (as viewed in FIG. 2) of the first filter portion 80 to attach the first filter portion 80 and filter assembly 26 to the tube sheet 44. The mounting sleeve 100 is made from a suitable material, such as stamped, drawn or otherwise formed metal. The mounting sleeve 100 defines an open axial end 101 of the first filter portion 80 for fluid communication with the clean air plenum 42. The first filter portion 80 has a generally-circular cross section, thereby forming a substantially-tubular interior passageway between the dirty air plenum 40 and the clean air plenum 42.

The filter assembly 26 extends through a respective opening 46 in the tube sheet 44 and through the band 66. The band 66 ensures that the filter assembly 26 may be used with openings 46 that have not been precisely cut, allowing for a suitable manufacturing tolerance without significantly affecting the performance of the baghouse 20 due to leakage between the tube sheet 44 and the filter assemblies 26. The mounting sleeve 100 defines an inverted cup portion that receives a part of the band 66.

The mounting sleeve 100 has a tubular portion 102 (FIG. 2) that is adapted to be located within and extend through a respective opening 46 in the tube sheet 44 and the band 66. A tubular support frame 104 (FIGS. 2 and 5) is fixed to and extends from the tubular portion 102 of the mounting sleeve 100. The support frame 104 is made from a suitable material, such as perforated sheet metal, expanded metal or mesh screen. The upper end of the support member 104 and the mounting sleeve 100 are connected together in a suitable manner, such as by welds, rivets, fasteners or metal deformation. Thus, a relatively strong structure exists that is capable of supporting the weight of the filter assembly 26 as it hangs from the tube sheet 44 even when the filter assembly 26 has a relatively heavy accumulation of particulates.

Pleated filter media 120 is located concentrically around the support member 104. The pleated filter media 120 is formed in a substantially tubular shape about the perimeter of the support member 104 with accordion folds at its inner and outer peripheries. The pleated filter media 120 has an effective filtering length or axial extent L1 (FIG. 2). The pleated filter media 120 may be constructed of any suitable material for a desired filtering requirement. Likewise, the pleated filter media 120 provided to the second filter portion 82 has an effective filtering length or axial extent L2. The support member 104 supports the pleated filter media 120 in a radial direction. The upper end of the pleated filter media 120 is also located in the mounting sleeve 100 and secured in a potting material, which acts to seal the pleated filter media 120 and the mounting sleeve 100.

The first filter portion 80 is illustrated as having media retention devices 122 extending circumferentially about the pleated filter media 120. The retention devices 122 serve to hold the pleated filter media 120 in place during reverse pulse-jet cleaning.

A tubular member or collar 140 is fixed to the support member 104 at the lowermost end (as viewed in FIGS. 2 and 5) of the first filter portion 80. The collar 140 of the first filter portion 80 defines an open axial end 105 of the first filter portion 80 for fluid to flow through. The collar 140 is made from a suitable material, such as metal. The support member 104 and collar 140 are connected together in a suitable manner, such as by welds, rivets, fasteners or metal deformation. Thus, a relatively strong structure is provided which is capable of supporting the weight of one or more filter portions, such as the second filter portion 82, for example, that may be connected to the first filter portion 80 even when those filter portions have acquired a heavy accumulation of particulates.

A flange portion 144 (see FIG. 5) is located near the upper end of the collar 140 (relative terms such as "upper" are best understood with reference to the filter assembly 26 suspended from the tube sheet 44 as shown in FIG. 1) and extends radially outward from the collar 140. By "radially" outward, it is meant that the flange portion 144 extends outwardly, generally away from longitudinal central axis A-A in a radial direction as indicated by the arrow 200 in FIG. 5. A side wall 146 extends at a right angle from the outer periphery of the flange portion 144 and is oriented in an upward direction when the filter assembly 26 is suspended from the tube sheet 44 to form part of a receiving cup for the lower end of the pleated filter media 120. A cup part 160 (FIG. 4) is defined by the collar 140. The collar 140 and cup part 160 cooperate to form the complete receiving cup for the lower end of the pleated media 120. The cup part 160 is attached to the collar 140 by suitable means, such as spot welds, for example, or can be formed as a monolithic unit by bending the material forming the flange portion 144, or can be formed in any other suitable manner.

Potting material 161 (see FIG. 5) is located between the exterior of the lower end of the pleated media 120, the flange portion 144 and side wall 146 within the cup part 160 to resist removal of the pleated filter media 120 from the cup part 160. The side wall 146 can optionally have a rolled bead projecting into the potting material to further resist removal.

Figure 3:
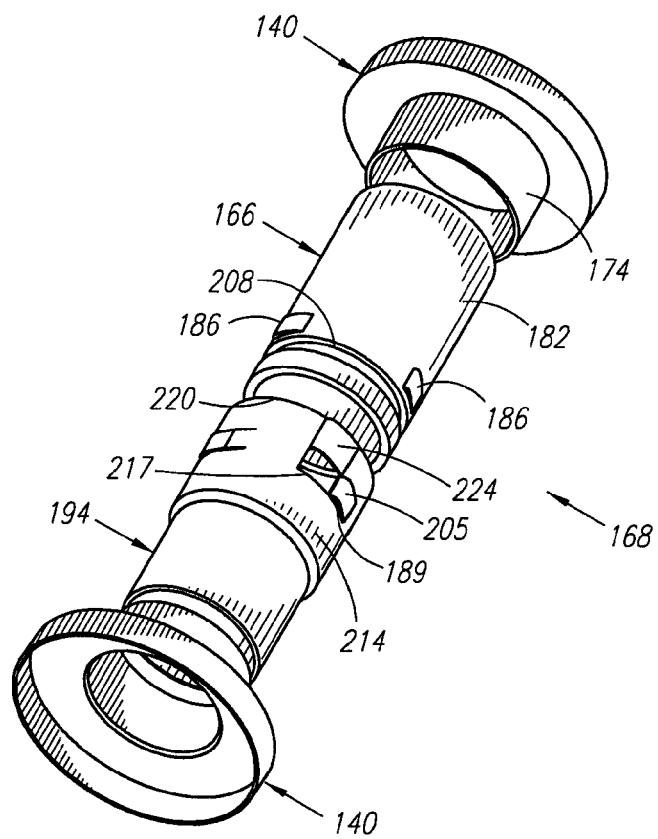
FIG. 3 is an exploded view of a coupler for connecting first and second filter portions according to an aspect of the invention.
Figure 4:
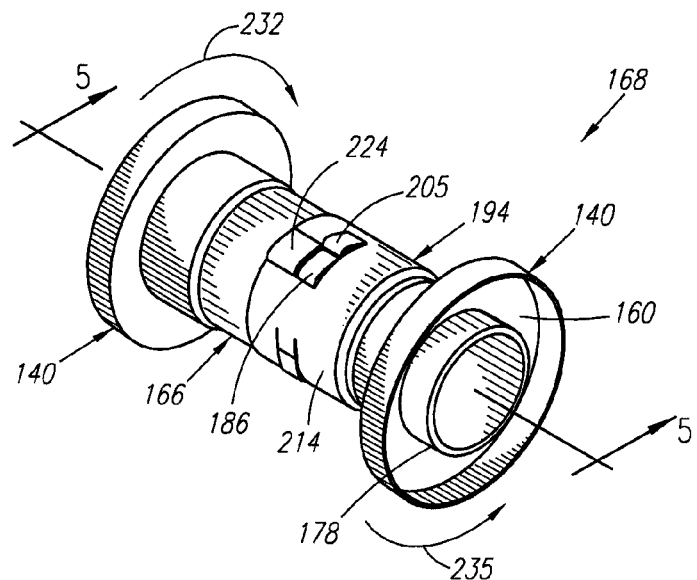
FIG. 4 is an assembled view of the coupler illustrated in FIG. 3.
Figure 5:
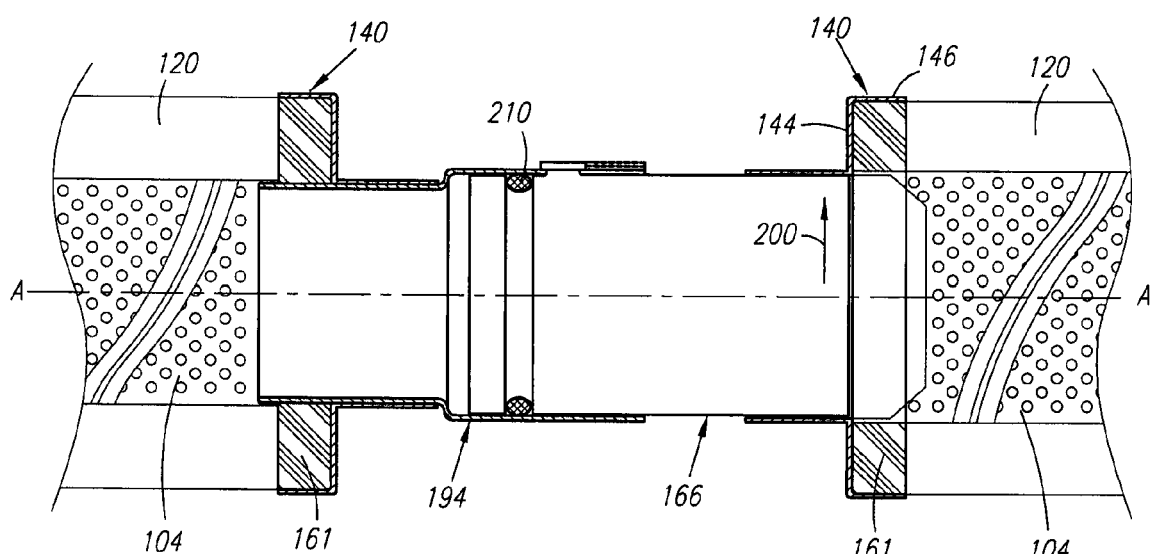
FIG. 5 is a sectional view of the assembled coupler in FIG. 3 taken along line 5-5.

The collar 140 can optionally be removably coupled to, or integrally formed as a monolithic structure with an upper coupling portion 166 included as part of a coupler 168 for connecting the first filter portion 80 to the second filter portion 82, shown best in FIGS. 3-5. For the embodiment shown in FIG. 3, the collar 140 includes a sleeve portion 174 that is separate from the upper coupling portion 166, and concentrically aligned to mate with the upper coupling portion 166 along axis A-A. The sleeve portion 174 can slide onto the upper coupling portion 166 when assembled, allowing a leading end 178 (FIG. 4) of the upper coupling portion 166 to extend into the cup part 160, thereby giving the cup part 160 an annular shape in which the potting material 161 (See FIG. 5) can be disposed along with an end of the pleated filter media 120.

The upper coupling portion 166 (see FIG. 3) includes a peripheral, and generally tubular side wall 182 supporting a cam 186 that is to be received by a receiver 189 formed in a lower coupling portion 194 to secure a connection between the upper and lower coupling portions 166, 194. The cam 186 shown in FIG. 3 includes an arcuate, concave external surface forming a protuberance that extends radially outward beyond the surrounding side wall 182. However, according to alternate embodiments the cam 186 can include an external surface of any shape that can radially displace a lug clip 205 as described in detail below to establish a snap-lock connection between the upper and lower coupling portions 166, 194.

The upper coupling portion 166 also includes a channel 208 recessed within the side wall 182, and extends about the circumference of the upper coupling portion 166. A compressible, o-ring gasket 210 is situated within the channel 208 when the upper and lower coupling portions 166, 194 are connected to form a generally gas-tight seal between the upper and lower coupling portions 166, 194. As can be appreciated, the gasket 210 compresses as the filter portions 80, 82 (see FIG. 1) are engaged together. According to alternate embodiments, the gasket 210 can be disposed within a channel (not shown) recessed within an interior peripheral wall of the lower coupling portion 194 instead of, or in addition to, the external periphery of the side wall 182 of the upper coupling portion 166.

The lower coupling portion 194 (see FIG. 3) includes a generally tubular peripheral side wall 214 or sleeve that defines the receiver 189, which in the embodiment shown in FIGS. 3-5 is an aperture with dimensions suitable to accommodate the cam 186 therein. The lug clip 205 is disposed adjacent to the receiver 189 to interfere with removal of the cam 186 from the receiver 189 once the cam 186 has been inserted into the receiver 189. An interior surface of the lug clip 205 can be arcuate, so as to mirror the external arcuate surface of the cam 186. According to alternate embodiments, the side wall 214 of the lower coupling portion 194 is a generally annular sleeve having a first radius of curvature. The lug clip 205 according to such embodiments is an arcuate member that extends outwardly beyond the side wall 214 in the radial direction and includes an inward facing concave surface having a radius of curvature that is shorter than the first radius of curvature. Further according to such embodiments, the cam 186 includes an outward-facing convex surface having a radius of curvature that is approximately the same as the radius of curvature of the inward-facing concave surface of the lug clip 205.

The lug clip 205 can be formed as a cantilevered segment cut on three sides from the side wall 214. As such, the lug clip 205 forms a peninsula of the side wall 214 material that extends at least partially over the aperture forming the receiver 189, to at least partially conceal the cam 186 when disposed within the receiver 189. As the cam 186 travels into the receiver 189 during to connect the first and second filter portions 80, 82, the arcuate external surface of the cam 186 makes contact with an interior surface of the lug clip 205, causing the lug clip 205 to be substantially-elastically displaced outwardly in a radial direction generally away from the coupler 168.

Displacement of the lug clip 205 is said to be substantially elastic since the lug clip 205 is urged towards an unbiased position, to which it returns when an external biasing force acting on the lug clip 205 is removed. The return of the lug clip 205 to its unbiased position is substantially elastic since the lug clip 205 may become fatigued during extended displacements, and may not return exactly to its unbiased position. Also, for embodiments wherein the external surface of the cam 186 and the interior surface of the lug clip 205 are arcuate, and approximately mirror each other, once the cam 186 is received by the receiver 189 the lug clip 205 can at least partially return to its unbiased position. In such a position the lug clip 205 remains in contact with the cam 186 to secure the cam 186 within the receiver 189 and resist removal of the cam from the receiver 189. The cam 186 can be removed from the receiver 189, and accordingly, the upper and lower coupling portions 166, 194 separated from each other by manual displacement of the lug clip 205 in the radially outward direction and subsequent rotation of the cam 186 out of the receiver 189 as described below.

The inside diameter of the side wall 214 of the lower coupling portion 194 and the outside diameter of the side wall 182 of the upper coupling portion 166 are sufficient to permit telescopic insertion of at least a portion of the upper coupling portion 166 into the lower coupling portion 194. An access notch 217 extends from an axial end 220 of the lower coupling portion to the receiver 189, forming an approximate right angle relative to the receiver 189 aperture. In other words, the access notch 217 and aperture forming the receiver 189 for a substantially "L" shaped aperture in the lower coupling portion 194. A brace 224 can optionally transversely span the access notch 217 to enhance rigidity of the axial end 220. The brace 224 includes an arcuate interior surface that mirrors the arcuate external surface of the cam 186, thereby allowing the cam 186 to travel under the brace 224 through the access notch 217 leading to the receiver 189.

Although the upper coupling portion 166 is shown and described as including the cam 186, and having an outside diameter that allows a portion of the upper coupling portion 166 to be telescopically inserted into the lower coupling portion 194, the invention is not so limited. Alternate embodiments can include an upper coupling portion 166 that defines the receiver 189 and lug clip 205, and has in inside diameter that allows a portion of the lower coupling portion 194 to be telescopically inserted into the upper coupling portion 166. Both the upper and lower coupling portions 166, 194 can be made of any suitably-rigid material, such as a plastic, metal, and the like. Further, there can be a plurality of cams 186 disposed circumferentially about the upper coupling portion 166. Likewise, there can be a plurality of cams 186 disposed circumferentially about the lower coupling portion 194.

Similar to the first filter portion 80, the second filter portion 82 includes a perforated tubular support frame 104 (FIG. 5) coupled to the lower coupling portion 194 in a suitable manner, such as by welds, rivets fasteners, metal deformation and the like. A pleated filter media 120 is disposed about and radially supported by the support frame 104. Potting material 161 is again disposed within a cup part 160 defined between a collar 140 and an axial end of the lower coupling portion 194 to resist separation of the pleated filter media from the lower coupling portion 194.

The first and second filter portions 80, 82 are illustrated as having media retention devices 122, 202, respectively, extending circumferentially about the pleated filter media 120. The retention devices 122, 202 serve to hold the pleated filter media 120 in place during reverse pulse-jet cleaning.

A plate 229 is located at the lower end (as viewed in FIG. 2) of the second filter portion 82 to define a closed end of the second filter portion 82 and the filter assembly 26. The plate 229 is preferably fixed to the tubular support frame 104. Potting compound is located between the exterior of the lower end of the pleated media 120 and the plate 229 to form a seal.

A method of effecting assembly and installation of the filter assembly 26 is described below. The method is directed to installing the relatively long filter assembly 26 in a new or existing baghouse 20.

The method includes providing the first filter portion 80 with the pleated media 120. The mounting sleeve 100 is located at one end and the collar 140 is located at the opposite end. Fluid may flow through both ends of the first filter portion 80.

The installer(s) located in the clean air plenum 42 connect together the first and second filter portions 80, 82. The lower filter portion 82 is held by one installer so it is at least partially in the clean air plenum 42 and at least partially in the dirty air plenum 40. The first filter portion 80 is supported by another installer so it is entirely in the clean air plenum 42. The first and second filter portions 80, 82 are aligned along the axis A-A as shown in FIG. 3, and the upper and lower coupling portions 166, 194 are brought into axial engagement. The second filter portion 82 is supported so it extends through the opening 46 in the tube sheet 44. The gasket 210 is placed between axially adjacent ends of the first and second filter portions 80, 82.

The filter portions 80, 82, or at least the coupling portions 166, 194 are rotated about axis A-A to align the one or more cams 186 provided to the upper coupling portion 166 with the access notch(es) 217 formed in the lower coupling portion. With the cam(s) 186 and access notch(es) so aligned, the upper and lower coupling portions 166, 194 are axially adjusted to insert each cam 186 into its respective access notch 217. The upper coupling portion 166 is at least partially telescopically inserted into the lower coupling portion 194 to position each cam 186 at the intersection of the generally "L" access notch 217 and receiver 189, as shown in FIG. 4.

Once each cam 186 has reached the intersection between the access notch 217 and receiver 189, the angular orientation of at least one of the upper and lower coupling portions 166, 194 is adjusted about axis A-A. For the embodiment shown in FIG. 4, the angular orientation of the upper coupling portion 166 can be adjusted in the direction of arrow 232, or the angular orientation of the lower coupling portion 194 can be adjusted in the direction of arrow 235, or the angular orientation of both coupling portions 166, 194 can be adjusted relative to each other in the direction of their respective arrow 232, 235 (see FIG. 4) to cause each cam 186 to be rotated into its respective receiver 189.

Upon the adjustment of the angular orientation of at least one of the upper and lower coupling portions 166, 194 relative to the other, each cam 186 will transition from the intersection between the access notch 217 and the receiver 189. In doing so, the external surface of each cam 186 will contact the inward-facing surface of their respective lug clip 205. This contact will cause the lug clip(s) 217 be displaced from their unbiased position in a radially outward direction, away from the lower coupling portion 194. Once each cam 186 has been fully received by the receiver 189, the lug clip 217 may at least partially return to its unbiased position, thereby interfering with relative angular adjustment of either or both of the upper and lower coupling portions 166, 194 relative to each other that would cause removal of each cam 186 from its respective receiver 189, and thereby securing the connection between the first and second filter portions 80, 82.

To disconnect the upper and lower coupling portions 166, 194, the lug clip 217 can be manually displaced in the radially-outward direction, thereby removing the obstruction resisting removal of the cam 186 from the receiver 189. With the lug clip 217 so adjusted, the angular orientation of either or both of the upper and lower coupling portions 166, 194 can be adjusted about axis A-A in a suitable direction to urge the cam 186 toward the intersection between the access notch 217 and the receiver 189. Once the cam 186 has reached the access notch 217, the upper and lower coupling portions 166, 194 can be separated from each other by axial adjusting at least on of the upper and lower coupling portions 166, 194 in the axial direction, thereby pulling the cam 186 through the access notch 217 and away from the lower coupling portion.

It will be apparent that a filter assembly 26 with a slightly different structure may optionally include a third and even additional filter portions (not shown). The third or additional filter portions are located between and connected to the upper filter portion 80 and the lower filter portion 82 to provide flexibility in establishing a length of the filter assembly 26. The third filter portion would have open axial ends and connecting structure at both ends.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A filter assembly to be secured within a baghouse for removing at least a portion of particulate matter entrained within a gas stream, the baghouse being divided into a plurality of plenums by a tube sheet that defines at least one opening through which the gas stream can travel between the plenums, the filter assembly including:

a first filter portion including a mounting structure provided adjacent to a first axial end to couple the first filter element to a support adjacent to the at least one opening defined by the tube sheet, a first generally-tubular frame coupled to and extending from the mounting structure, and a first pleated filter media disposed adjacent to the first generally-tubular frame;

a second filter portion including a second generally-tubular frame and a second pleated filter media disposed adjacent to the second generally-tubular frame; and a coupler for connecting the first filter portion to the second filter portion and establishing fluid communication between the first and second filter portions when connected, the coupler including:

a first coupling portion including a side wall defining a receiver and a lug clip disposed adjacent to the receiver, said lug clip being substantially-elastically displaceable to be displaced in a radial direction during connection of the first and second coupling portions, and a second coupling portion including a side wall supporting a cam that causes substantially-elastic displacement of the lug clip in the radial direction as the cam travels into the receiver during adjustment of a relative angular orientation between the first and second coupling portions caused by a twisting force imparted onto at least one of the first and second coupling portions.

2. The filter assembly according to claim 1, wherein the side wall of the first coupling portion is a generally annular sleeve having a first radius of curvature, and the lug clip is an arcuate member that extends outwardly beyond the side wall in the radial direction and includes an inward facing concave surface having a radius of curvature that is shorter than the first radius of curvature.

3. The filter assembly according to claim 2, wherein the cam includes an outward-facing convex surface having a radius of curvature that is approximately the same as the radius of curvature of the inward-facing concave surface of the lug clip.

4. The filter assembly according to claim 1 further including a gasket that sealingly engages both the first and second coupling portions when the first and second coupling portions are connected to form a substantially gas-tight seal.

5. The filter assembly according to claim 4, wherein the lug clip is displaced from an unbiased position in the radial direction as the cam travels into the receiver, and substantially returns to the unbiased position when the cam has been received by the receiver to interfere with relative angular adjustment between the first and second coupling portions causing removal of the cam from the receiver.

6. The filter assembly according to claim 1, wherein the first coupling portion includes a plurality of receivers and lug clips about a circumference of the first coupling portion.

7. The filter assembly according to claim 6, wherein the side wall of the second coupling portion includes a plurality of cams distributed circumferentially about the second coupling portion.

8. The filter assembly according to claim 1, wherein the lug clip conceals at least a portion of the receiver.

9. The filter assembly according to claim 1 further including an access notch extending between the receiver and a peripheral end of the first coupling portion forming a passageway along which the cam can travel to be received within the receiver.

10. The filter assembly according to claim 9, wherein the access notch forms an approximately right angle relative to the receiver.

11. The filter assembly according to claim 1, wherein at least one of the first and second filter portions includes a flanged collar adjacent to one axial end of the pleated filter material adjacent to the coupler, said flanged collar including a side wall to circumferentially surround a potting compound and an end portion of the respective pleated filter material projecting into the potting compound to resist separation of the pleated filter from the potting material.

12. The filter assembly according to claim 1 further including an end plate provided adjacent a distal axial end of the second filter portion to define a closed end of the second filter portion.

13. A filter assembly to be secured within a baghouse for removing at least a portion of particulate matter entrained within a gas stream, the baghouse being divided into a plurality of plenums by a tube sheet that defines at least one opening through which the gas stream can travel between the plenums, the filter assembly including:
   first filter means for removing at least a portion of particulate matter entrained within a gas stream to be supported adjacent to the at least one opening defined by the tube sheet;
   second filter means for removing at least a portion of particulate matter entrained within the gas stream, the second filter means to be coupled to the first filter means; and
   a coupler including a first coupling portion provided adjacent to a distal end of the first filter means and a second coupling portion provided adjacent to a proximate end of the second filter means, the first and second coupling portions being cooperable to connect the first filter means to the second filter means and establish fluid communication between the first and second filter means when connected, the first coupling portion including:
      radially-displaceable means for securing a connection between the first and second coupling portions, said connection having been established by relative adjustment between the first and second coupling portions in a first angular direction, and interfering with a release of said connection by relative adjustment between the first and second coupling portions in a second angular direction, wherein the radially-displaceable means is substantially-elastically displaced in a radial direction relative to a longitudinal axis of the first coupling portion to interfere with the relative adjustment between the first and second coupling portions in the second angular direction.

14. The filter assembly according to claim 13 further including a gasket that sealingly engages both the first and second coupling portions when the first and second coupling portions are connected to form a substantially gas-tight seal.

15. The filter assembly according to claim 13, wherein at least one of the first and second filter means includes a flanged collar adjacent to one axial end of a pleated filter adjacent to the coupler, said flanged collar including a side wall to circumferentially surround a potting compound and an end portion of a respective pleated filter projecting into said potting compound to resist separation of the pleated filter from the potting material.

16. A baghouse for filtering at least a portion of particulate matter from a gas stream including:
   a housing divided into at least first and second plenums by a substantially planar tube sheet defining a plurality of openings establishing gaseous communication between the first and second plenums;
   a plurality of filter assemblies to be secured adjacent to the openings defined by the tube sheet, each of said filter assemblies including:
      a first filter portion including a mounting structure provided adjacent to a first axial end to couple the first filter element to a support within the baghouse adjacent to at least one of the openings defined by the tube sheet, a first generally-tubular frame coupled to and extending from the mounting structure, and a first pleated filter media disposed adjacent to the first generally-tubular frame;
      a second filter portion including a second generally-tubular frame and a second pleated filter media disposed adjacent to the second generally-tubular frame; and
      a coupler for connecting the first filter portion to the second filter portion and establishing fluid communication between the first and second filter portions when connected, the coupler including:
         a first coupling portion including a side wall defining a receiver and a lug clip disposed adjacent to the receiver, said lug clip being substantially-elastically displaceable to be displaced in a radial direction from an unbiased position during connection of the first and second coupling portions, and
         a second coupling portion including a side wall supporting a cam that causes substantially-elastic displacement of the lug clip in the radial direction as the cam travels into the receiver during adjustment of a relative angular orientation between the first and second coupling portions caused by a twisting force imparted onto at least one of the first and second coupling portions.

* * * * *